United States Patent [19]

Quick

[11] 4,196,569

[45] Apr. 8, 1980

[54] CANE FEED ROLLER

[75] Inventor: Donald J. Quick, Bundaberg, Australia

[73] Assignee: Massey-Ferguson Services N.V., Curacao, Netherlands Antilles

[21] Appl. No.: 934,146

[22] Filed: Aug. 16, 1978

[30] Foreign Application Priority Data

Aug. 16, 1977 [AU] Australia ............................ 34247/77
Jan. 13, 1978 [AU] Australia ............................ 01372/78

[51] Int. Cl.² ............................................ A01D 45/10
[52] U.S. Cl. ..................................... 56/13.9; 198/518
[58] Field of Search ...................... 56/13.6, 13.7, 13.8, 56/13.9, 328 R; 198/518, 624

[56] References Cited

U.S. PATENT DOCUMENTS

| 1,650,796 | 11/1927 | Kellogg | 56/328 R |
| 3,673,774 | 7/1972 | Mizzi | 56/13.9 |
| 3,950,924 | 4/1976 | Quick | 56/13.9 |

*Primary Examiner*—Russell R. Kinsey
*Attorney, Agent, or Firm*—Robert L. Farris

[57] ABSTRACT

A harvester for sugar cane sticks or similar crops having a feed roller with feed elements extending lengthwise of the roller to successively engage the sticks on rotation of the roller, to feed the sticks in a direction at right angles to the axis of rotation of the roller. At least one of the feed elements being in the form of a resiliently deformable hollow structure of elastomeric material.

16 Claims, 7 Drawing Figures

CANE FEED ROLLER

This invention relates to a harvester for sugar cane or similar crops such as bamboo, having an improved stick feeding roller. The invention also relates to the use of the improved stick feeding roller in other sugar cane handling machinery such as sugar cane mills (for the handling of whole cane sticks) and in planters for sugar cane or similar crops, such as Cassava, in which whole cane sticks are handled by driven stick feeding means.

In U.S Pat. No. 3,950,924 we have disclosed a sugar cane harvester including a stick feeding roller having cane-engaging feed elements in the form of metal bars which are so mounted as to be able to accommodate variations in the thickness of the layer of cane being fed through the harvester while maintaining a reasonably constant rate of cane feed. This avoids the need to mount the whole roller so that it can be moved bodily in response to such changes, which in turn considerably simplifies the drive for the roller—especially if a mechanical drive (such as a chain) is used. Moreover, an enclosed lubricated drive can be used.

However, the roller disclosed in the above U.S. patent would be even better it it could be made more durable and simpler in construction and if it could accommodate local deformations more readily. It is an aim of the present invention to provide at least one of these improvements.

According to the present invention there is provided a harvester for sugar cane or similar crops comprising;

base cutting means operative to sever cane sticks from their roots;

stick cutting means operative to cut severed cane sticks into two or more pieces; and stick feeding means operative to feed severed cane sticks from said base cutting means to said stick cutting means;

said stick feeding means comprising a feed roller positioned for engagement with said severed cane sticks and mounted for rotation about a rotation axis, together with a drive to rotate the roller, said feed roller comprising feed elements extending lengthwise of the roller to successively engage the cane sticks upon rotation of the roller, characterized in that at least one of said feed elements comprises a resiliently deformable hollow structure comprising elastomeric material.

The invention also provides a feed roller, suitable for use in stick feeding means of machinery for handling sugar cane or the like, in which said roller would be rotated by a drive and positioned for engagement with cane sticks to effect feeding of the sticks in a direction at right angles to the axis of rotation of the roller, the feed roller comprising feed elements extending lengthwise of the roller to successively engage the cane sticks upon rotation of the roller, characterized in that at least one of said feed elements comprises a resiliently deformable hollow structure comprising elastomeric material.

An embodiment of the invention will now be described by way of example with reference to the accompanying drawings in which.

Figure 1:
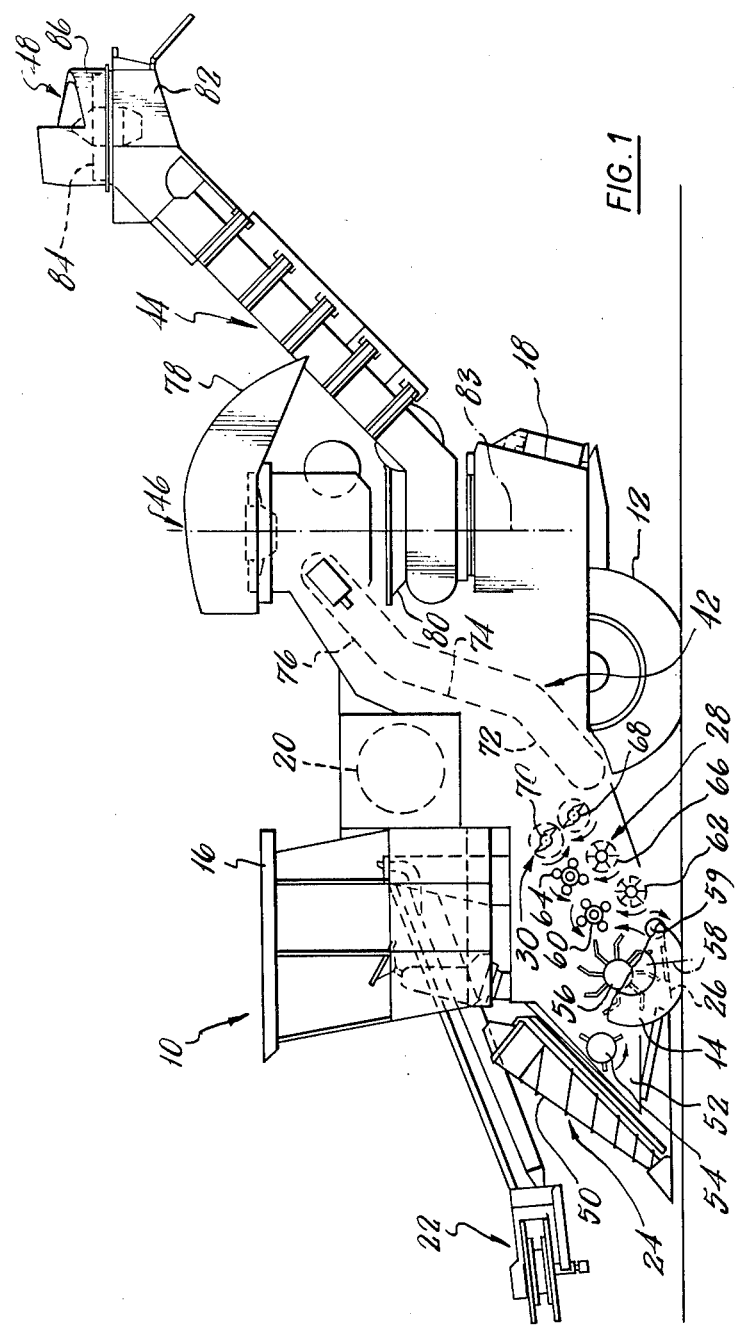
FIG. 1 shows a sugar cane harvester in side elevation, with part of its structure cut away to reveal its cane stick handling apparatus.

As shown in FIG. 1, a harvester 10 for sugar cane (which could also be used for harvesting similar crops such as bamboo) comprises driven rear wheels 12 and steerable front wheels 14 that support a harvester frame on which is mounted a driver's cab 16, a diesel engine within a housing 18, a radiator and associated air cleaning apparatus 20 for the engine, and crop handling and treatment apparatus described below.

The crop handling and treatment apparatus of harvester 10 comprises cane topping apparatus 22, crop gathering and feed-in means 24, base cutting means 26 for severing cane sticks from their roots, stick feeding means 28 for feeding severed cane sticks rearwards from the base cutting means, stick cutting means 30 to cut severed cane sticks into billets of length 30 to 40 centimeters, primary and secondary billet elevators 42, 44 and associated primary and secondary sets of trash removal apparatus 46 and 48 respectively.

Cane topping apparatus 22 is more fully described in U.S. Pat. No. 4,008,557.

Crop gathering and feed-in means 24 comprises a pair of laterally-spaced hydraulically-driven stick lifting spirals 50. The spirals are mounted at the front end of a crop feed passage extending rearwards through the harvester. The forward end of the passage constitutes part of crop gathering and feed-in means 24 and is defined by two laterally spaced upright walls 52 which converge slightly to form a gathering throat. Mounted on the spaced upright walls and extending across the gathering throat are a paddle-type forward feed roller 54, and a combined spike and paddle type power feed roller 56, the latter being positioned directly above base cutting means 26. The rollers are power-rotated in the directions indicated and extend across the gathering throat to promote the in-feed of cane sticks.

Base cutting means 26 is more fully described in U.S. Pat. No. 4,098,060 and comprises a pair of in-running contra-rotatable base cutters each comprising a disc carrying projecting blades, the base cutters being rotatable about respective laterally-spaced upwardly extending axes 58.

Stick feeding means 28 comprises a butt lifter roller 59 and first and second pairs of feed rollers 60, 62, and 64, 66 respectively. All five rollers extend across the crop feed passage and are provided with drives to rotate them in the directions indicated, about respective rotation axes.

Butt lifter roller 59 is positioned immediately behind the base cutters 26 to raise the butt ends of the cane sticks immediately after severance by the base cutters.

The upper rollers 60 and 64 of each pair of feed rollers will be described in detail later. The lower rollers 62, 66 of each pair comprise feed elements in the form of metal paddles extending lengthwise of the roller. The upper and lower rollers are positioned so that in use they feed cane sticks between them, from the base cutters 26 to the stick cutting means 30.

Stick cutting means 30 is more fully described in U.S. Pat. No. 4,065,197 and comprises a pair of chopper drums 68, 70 which extend across the crop feeding passage and are mounted for rotation about respective spaced parallel axes. The chopper drums are rotated in the directions indicated in timed relationship by a drive. Two axially extending blades are mounted on each chopper drum. The blades on one drum co-operate with those on the other drum, in pairs, to chop the cane sticks into billets as the drums rotate.

Primary billet elevator 42 is more fully described in U.S. Pat. No. 3,942,307 and comprises an assembly of chains and slats arranged in three runs 72, 74, 76 inclined with respect to each other. A ceiling plate (not shown) is provided above the steeply inclined middle run 74 of the conveyor to prevent billets rolling back.

Primary trash removal apparatus 46 comprises an axial flow extractor fan (not shown) to pass air through the cascade of billets falling from the upper end of primary billet elevator 42 and thereby entrain trash with the air and remove the trash from the harvested crop. The trash is separated from the air stream and discharged downwards through a chute 78. Trash removal apparatus 46 is more fully described in our Australian Pat. No. 487,197.

A hopper or boot 80 collects the billets at the lower end of secondary billet elevator 44. The latter is a chain and slat type elevator which at its upper end drops the billets through a hood 82 into a transport vehicle (not shown) behind or alongside cane harvester 10. Elevator 44 is mounted for pivotal movement about a vertical axis 83 by means of hydraulic rams controlled from cab 16, between its rear discharge and side discharge positions.

Hood 82 forms part of secondary trash removal apparatus 48 which comprises an axial flow extractor fan 84 and a trash discharge duct 86 and is more fully described in U.S. Pat. No. 4,155,602 and U.S. Pat. No. 4,129,339. The upper cane stick feed rollers 60 and 64 will now be described in more detail with reference to FIGS. 2 and 3. Rollers 60 and 64 are substantially identical in structure and arrangement, and the following description, though referring by number to roller 60, should be read as referring also to roller 64. Feed roller 60 is mounted for rotation about its rotation axis 86 which extends horizontally across the crop feed passage of harvester 10. The roller comprises a central support member in the form of a cylindrical shaft 88 journalled on bearings at each end, on the upright walls defining the crop feed passage. End flanges 90 are welded to shaft 88 at each end.

The end flanges 90 attach to corresponding flanges (not shown) on stub shafts journaled in bearings on the spaced upright walls.

Figure 2:
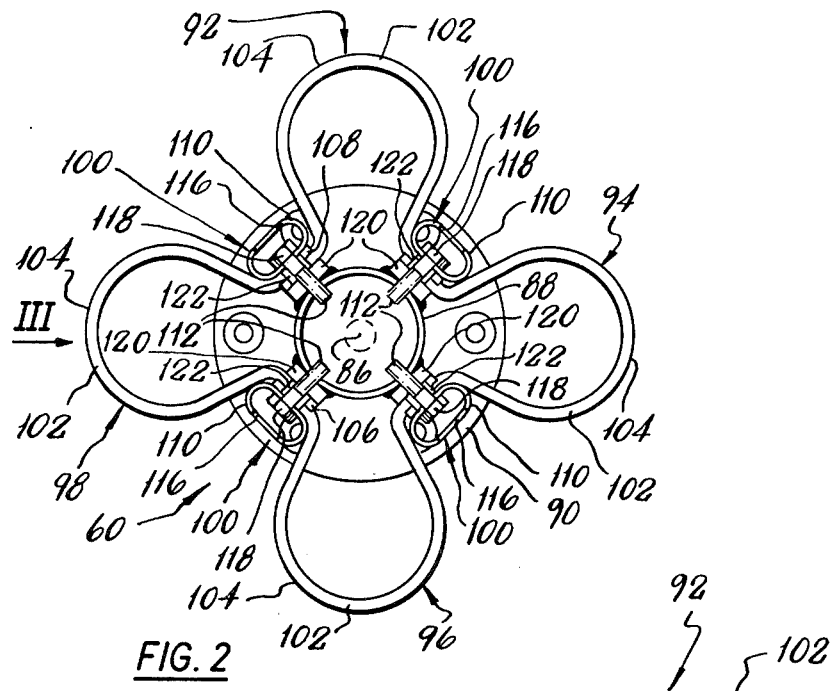
FIG. 2 shows an enlarged end elevation view of a cane stick feeding roller also seen in FIG. 1.

Four feed elements or paddles 92, 94, 96, 98 are mounted on shaft 88 by mounting means 100 therefor and disposed symmetrically about the rotation axis 86 of the roller. The feed elements extend lengthwise of roller 60 parallel to its rotation axis 86, and each feed element consists of its own piece of elastomeric sheet material 102 formed into a resiliently deformable hollow structure. The sheet material is secured at a plurality of spaced apart positions along its length by said mounting means 100 to shaft 88 and itself provides a convex cane-engaging surface 104 between said positions. For example, in the case of feed element 98, its piece of elastomeric sheet material 102 has ends 106, 108 and the length of the piece (as referred to above) is measured along the curved profile of the piece between these ends. Between the said ends, the elastomeric sheet material forms a hollow structure in the form of a generally pear-shaped lobe as seen in FIG. 2, and this pear-shaped lobe provides the convex cane engaging surface 104. The other feed elements 92, 94 and 96 are similar in form to feed element 98.

Elastomeric sheet material 102 is in the form of vulcanized natural rubber sheet having one or more plies of woven textile reinforcement embedded therein.

Mounting means 100 for the feed elements 92, 94, 96, 98 comprises four clamping members in the form of tubes 110, and associated fasteners in the form of bolts 112. Clamping tubes 110 extend lengthwise of roller 60 parallel to its rotation axis 86 at equally circumferentially spaced positions, and each has an oval cross-sectional shape which is well adapted for the clamping function of the tube.

Each clamping tube 110 is formed at spaced locations along its length with pairs 114 of aligned apertures: a large clearance aperture 116 in one flat side face of the tube and a smaller aperture opposite the large aperture. Apertures 116 permit the heads 118 of bolts 112 to be received within and thereby shielded by the clamping tubes. They also permit the entry of wrench to engage the bolt heads. The smaller apertures, aligned with apertures 116 receive the shanks of bolts 112.

Four clamping strips 120 formed at spaced intervals along their length with screw threaded apertures, are welded to central shaft 88 to receive in screw-threaded engagement the shanks of bolts 112, whereby the bolts can cause clamping tubes 110 to clamp the elastomeric sheet material of feed elements 92, 94, 96 and 98 in position. The clamping strips extend parallel to rotation axis 86 along the full width of the four pieces of elastomeric sheet material. Clearance apertures are provided in shaft 88 under the clamping strips to permit entry of the shanks of the bolts into the shaft.

A cylindrical spacer sleeve 122 is provided for each bolt 112, to be received on the shank of the bolt between its clamping tube 110 and its nut 120, to define the amount of compression which should be applied to the ends of the pieces of elastomeric sheet material in order to securely clamp them in position.

The ends of the pieces of elastomeric sheet material are punched with apertures of such a size and at such locations as to snugly receive spacer sleeves 122.

On assembly of roller 60, the parts are assembled as shown in FIG. 2 and bolts 112 are tightened until spacer sleeves 122 prevent further tightening.

In use, harvester 10 proceeds along a row of standing cane. The cane tops are removed by topping apparatus 22, the sticks are severed from their roots by cutting means 26, and the sticks fed inwards by rollers 54, 56. Butt lifter roller 59 raises the butts of the sticks which then pass upwards and rearwards between the rotating feed rollers 60, 62 and 64, 66. The lower rollers 62, 66 support the sticks, while the convex surfaces of the feed elements 92, 94, 96 and 98 successively engage and lightly but firmly grip the mat of cane sticks and feed it rearwards between cane chopper drums 68, 70.

The chopper drums 68, 70 chop the cane sticks into billets about 30 centimeters in length which are then elevated successively by the primary and secondary elevators 42, 44 and trash is removed by the primary and secondary sets of trash removal apparatus 46, 48, before the billets drop through hood 82, into transport vehicles (not shown).

Among the advantages provided by the embodiment of the invention described above are the following:

1. Effective feeding of cane sticks to the chopper drums. The resiliently deformable feed elements lightly but firmly grip the cane sticks with a minimum of slippage relative to the sticks, whereby the length of billet produced by the choppers is rendered more constant;

2. Ability to accommodate variations in the thickness of the cane mat (whether across the full width of the crop feed passage or just at one side) without significant variations in feeding efficiency;

3. Improved durability, which arises from the resiliently deformable feed elements' ability to deform to allow stones and wood to pass, from the relatively light pressure which they exert on the cane, and from their smooth cane engaging surfaces and high fatigue resistance;

4. Simplicity of construction, which is evident from the above description.

Figure 4:
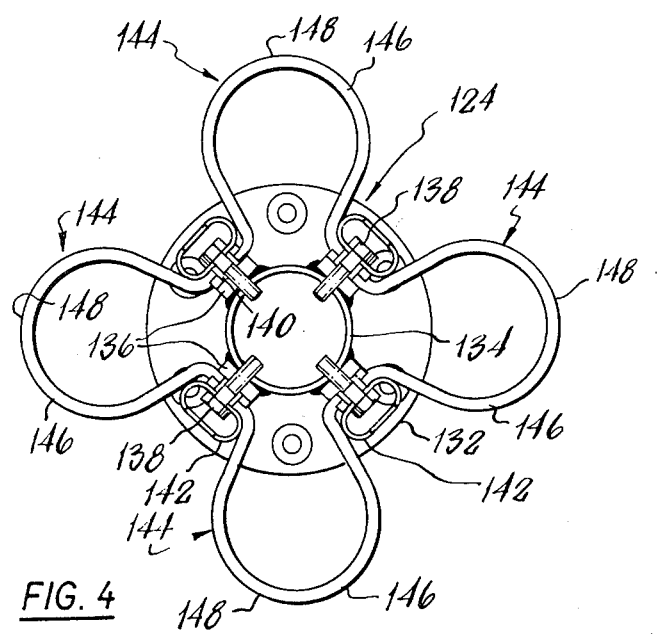
FIG. 4 is an end elevational view of the cane stick feeding roll of FIG. 3.
Figure 5:
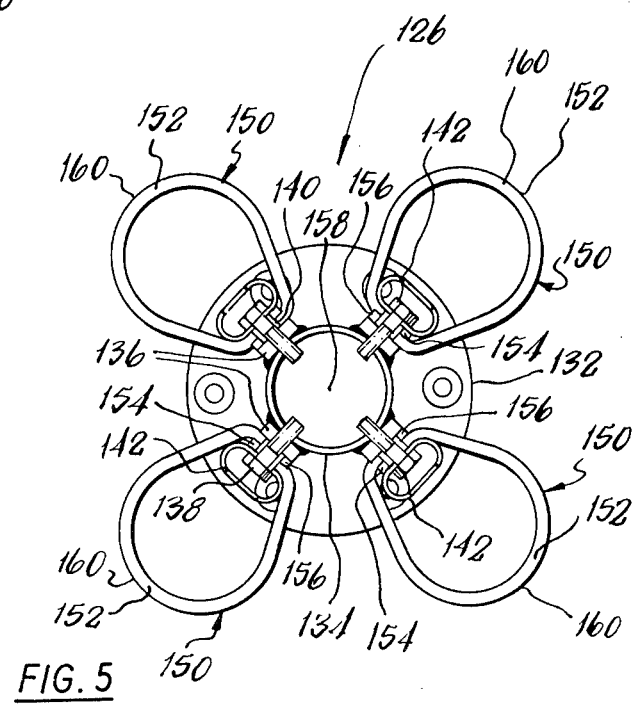
FIG. 5 is an end elevational view of a modified form of the cane stick feeding roll with both ends of each section of reinforced elastomeric sheet material clamped to a shaft by the same clamping tube.
Figure 7:
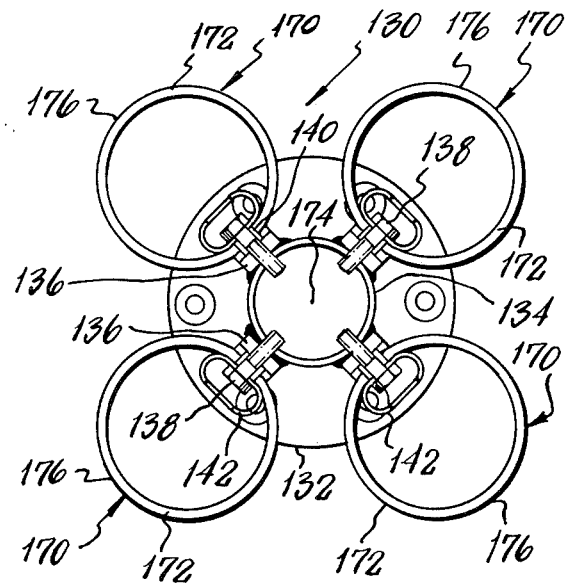
FIG. 7 is an end elevation of a modified form of the cane stick feeding roll with four feeding elements each formed from a tube of elastomeric material.
Figure 6:
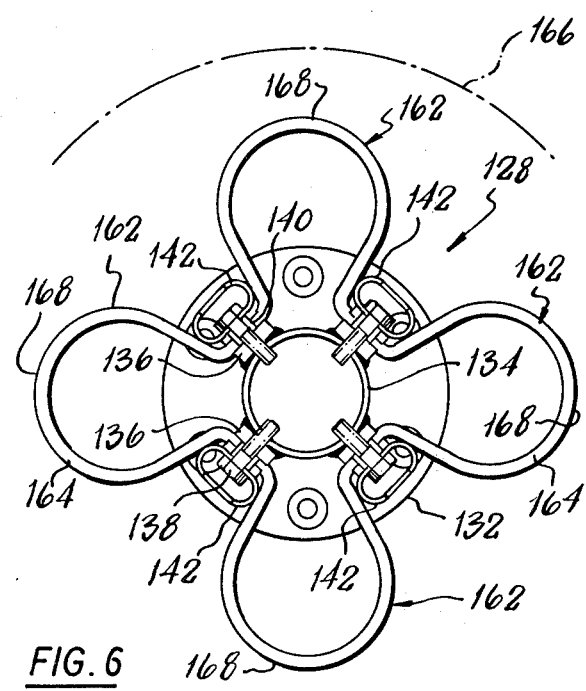
FIG. 6 is an end elevation of a modified form of the cane stick feeding roll with four feeding elements formed by deforming inwardly the walls of single piece of tubing of elastomeric material.

FIGS. 5, 6 and 7 illustrate three further embodiments of the invention. FIG. 4 is another view of the embodiment of FIGS. 1 to 3, which is placed alongside FIGS. 5 to 7 for comparison purposes.

Figure 3:
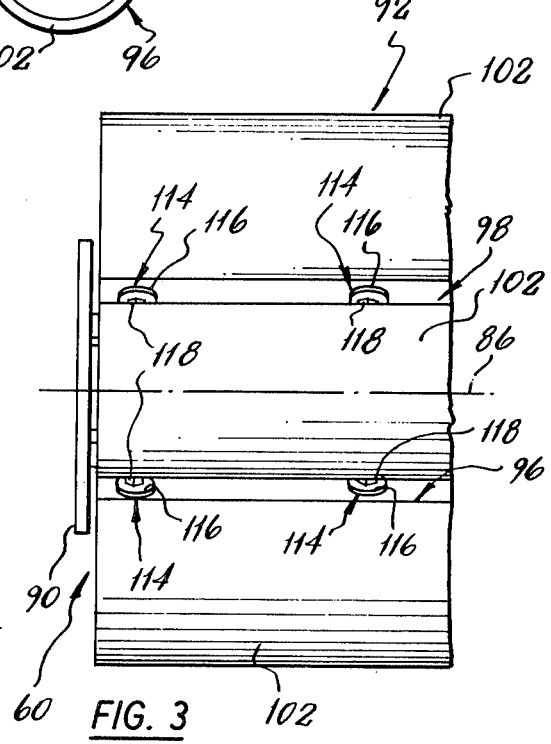
FIG. 3 shows a plan view of a portion of the length of the roller of FIG. 2, the direction of viewing being indicated by arrow III in FIG. 2.

The feed rollers 124, 126, 128 and 130 shown in FIGS. 4, 5, 6 and 7 respectively comprise respective end flanges 132, cylindrical shafts 134, clamping strips 136, bolts 138, spacer sleeves 140, and clamping tubes 142 arranged as in the embodiment of FIGS. 1 to 3. The differences between the embodiments lie in the structure and arrangement of the feed elements of the feed rollers.

In the case of the embodiments of FIGS. 4, 5 and 7, each feed element comprises its own piece of resilient sheet material, whereas in the embodiment of FIG. 6 one piece of resilient sheet material provides the cane engaging surfaces of more than one feed element—or more specifically, one piece of resilient sheet material provides four feed elements. The details of each embodiment will now be described.

The embodiment of FIG. 4 requires little more description. The four feed elements 144 are each in the form of a resiliently deformable hollow structure comprising elastomeric material, each being formed from its own piece of textile-reinforced material rubber sheet 146—for example conveyor belting. Each piece of rubber sheet 146 is clamped between two sets of clamping tubes 142 and clamping strips 136 at its ends, one set at each end. The feed element has a convex cane-engaging surface 148 at a position between (considered in the circumferential direction of the roller) the two sets of clamping tubes and clamping strips. Surface 148 is provided by the elastomeric material (natural rubber sheet 146) itself.

In the embodiment of FIG. 5, again, each feed element 150 is formed from its own piece of textile-reinforced elastomeric (natural rubber) sheet material 152. In this case however, both ends 154, 156 of the sheet are clamped to shaft 134 by the same clamping tube 142 and clamping strip 136, the sheet extending round the clamping tube as viewed in the direction of the rotation axes 158 of the roller, and the convex cane-engaging surface 160 of the feed element being provided at a position radially outwardly of, and radially aligned with the clamping tube 142.

The four feed elements 162 of roller 128 in FIG. 6 are formed by a single piece of elastomeric material 164 in the form of a length of tubing 166 indicated by a chain dot line. Tubing 166 is deformed inwardly from its cylindrical form indicated by line 166, at four circumferentially spaced positions by clamping tubes 142 so as to provide pear-shaped-section feed elements 162 having convex cane-engaging surfaces 168 between these positions.

Feed roller 130 in FIG. 7 comprises four feed elements 170. As in the embodiments of FIGS. 4 and 5, each feed element comprises its own piece of elastomeric material 172, this material extending round the clamping tube 142, as viewed in the direction of the rotation axis 174 of the roller. The elastomeric material provides a convex cane-engaging surface 176 at a position radially outwardly of, and radially aligned with the clamping tube 142.

However, the four pieces of elastomeric material 172 are in this embodiment formed as tubes—as opposed to the elastomeric material in the embodiment of FIG. 5 which is held in tube-like forms by clamping tubes 142. The clamping tubes 142 in FIG. 7 are located within the tube-like feed elements 170.

The mode of operation of the feed rollers of FIGS. 5 to 7 is substantially the same as that of FIGS. 2 to 4 which has already been described.

Among modifications which could be made in the above-described embodiments which fall within the scope of the invention are the following:

1. the use of less than four (that is to say one, two or three), or more than four, resiliently deformable hollow feed elements comprising elastomeric material, together with (if necessary) an appropriate number of clamping tubes (that is, one or more);

2. the use, in combination with any appropriate number of resiliently deformable hollow feed elements comprising elastomeric material, of feed elements of another form or forms, for example conventional steel cane feeder paddles—the latter preferably projecting outwards from the roller a smaller distance than the deformable feed elements (in their undeformed state);

3. the use of a single piece of elastomeric material to form two or more feed elements;

4. the use of elastomeric materials other than natural rubber, such as synthetic rubber and polyurethane. These elastomeric materials can have any suitable reinforcement embedded therein such as one or more plies of woven or non-woven textile material, or steel cords or the like. Such reinforcement can be substantially inextensible. Extra reinforcement may be incorporated at high stress areas in the feed elements;

5. the use of these elastomeric materials as preformed (for example moulded) articles which already have the desired hollow structure and any desired cross-sectional shape before assembly on the roller—as an alternative to the use of such material in the form of pre-formed flat sheet material, as in the embodiments described above. Where preformed feed elements are used, the apertures therein to receive the clamping bolts 118 and 138 can also be conveniently preformed therein to further simplify assembly of the rollers.

Also it is to be understood that the invention is not restricted to use in sugar cane harvesters but has applications in other machinery for handling sugar cane sticks or the like in which one or more cane stick feeding rollers (e.g. roller 60 in the above described first embodiment) would be rotated by a drive and positioned for engagement with cane sticks to effect feeding of the sticks in a direction at right angles to the axis of rotation of the roller.

I claim:

1. A harvester for sugar cane or similar crops comprising:
   a frame;
   base cutting means mounted on said frame operative to sever cane sticks from their roots;
   stick cutting means mounted on said frame operative to cut severed cane sticks into two or more pieces; and
   stick feeding means mounted on said frame operative to feed severed cane sticks from said base cutting means to said stick cutting means;
   said stick feeding means including a feed roller positioned for engagement with said severed cane sticks and mounted for rotation about a rotation axis, said feed roller comprising a plurality of feed elements extending lengthwise of the roller to successively engage the cane sticks upon rotation of the roller wherein each of said plurality of feed elements includes a resiliently deformable hollow structure of elastomeric material.

2. A harvester according to claim 1 wherein said elastomeric material itself provides a cane-engaging surface of each said feed element.

3. A harvester according to claim 2 wherein said cane-engaging surface is convex in form.

4. A harvester according to claim 1 wherein said resiliently deformable hollow structure is formed by moulding an elastomeric material.

5. A harvester according to claim 1 wherein said resiliently deformable hollow structure is formed from elastomeric sheet material.

6. A harvester according to claim 1 wherein each feed element comprises its own piece of elastomeric material.

7. A harvester according to claim 1 wherein one piece of elastomeric material provides the cane engaging surfaces of at least two feed elements.

8. A harvester according to claim 7 wherein said one piece of elastomeric material is formed as a length of tubing, the length of tubing being deformed inwardly at circumferentially spaced positions and providing the cane engaging surfaces of said feed elements between said spaced positions.

9. A harvester according to claim 1 wherein said feed roller comprises a central support member and mounting means for mounting said feed elements on the central support member, said mounting means comprising a clamping member extending lengthwise of the roller, and fasteners whereby said elastomeric material is clamped between the central support member and the clamping member.

10. A harvester according to claim 9 wherein said mounting means comprises at least two clamping members and associated fasteners at circumferentially spaced positions on the feed roller, the elastomeric material being clamped between said central support member and said clamping members at the spaced positions, and the elastomeric material providing the cane-engaging surface of the feed element between these spaced positions.

11. A harvester according to claim 9 wherein said elastomeric material extends around the clamping member as viewed in the direction of the rotation rotation axis of the feed roller and provides a cane-engaging surface of the feed element at a position radially outwardly of, and radially aligned with the clamping member.

12. A harvester according to claim 11 wherein said elastomeric material has ends which are both clamped between the same clamping member and the central support member.

13. A harvester according to claim 11 wherein said elastomeric material is formed as a tube, the clamping member being located within the tube.

14. A harvester according to claim 9 wherein said fasteners are in the form of bolts, and said clamping member is in the form of a tube formed with clearance apertures on one side to receive the heads of said bolts whereby the heads are received within the clamping tube and shielded by the tube.

15. A harvester according to claim 1 wherein said elastomeric material comprises natural or synthetic rubber, or polyurethane.

16. A harvester according to claim 1 wherein said elastomeric material is in the form of generally pear-shaped lobes as viewed in the direction of the rotational axis of the feed roller.

* * * * *